United States Patent Office 3,527,767
Patented Sept. 8, 1970

3,527,767
PROCESS FOR THE PREPARATION OF THIOLANES SUBSTITUTED IN THE 2-POSITION
Pierre Legendre, Pau, France, assignor to Société Nationale des Pétroles d'Aquitaine, Courbevoie, France
No Drawing. Filed Apr. 30, 1968, Ser. No. 725,483
Claims priority, application France, May 3, 1967, 105,058
Int. Cl. C07d 63/04
U.S. Cl. 260—332.1      10 Claims

ABSTRACT OF THE DISCLOSURE

This invention has to do with a process for the preparation of thiolanes in which the carbon in the 2-position carries a halogenated carbon atom, characterized in that a halogen is caused to react with a substituent such as an electro-negative substituent similar to a 1-thio-5,5-dihalo-4-pentene derivative.

BACKGROUND OF THE INVENTION

The thiolane family have considerable industrial importance, particularly in the preparation of sulphanes. It has, thus, been of commercial interest to be able to change their properties by the introduction of various substituents into the thiolane molecule. In the past, this has been possible only with difficulty and at considerable expense, so that it was not economically possible. These and other difficulties experienced with the prior art devices have been obviated in a novel manner by the present invention.

It is, therefore, an outstanding object of the invention to provide a process for the preparation of thiolanes with substituents in the 2-position, which process is easily carried out at low cost.

Another object of this invention is the provision of a process for making a thiolane in which the carbon atom adjacent that of the sulfur atom carries a halogenated carbon atom.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, the invention has to do with the manufacture of products which can be represented in one of the following forms:

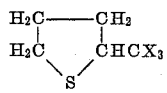 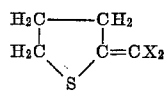

in which X represents a halogen atom, mainly chlorine or bromine. The process consists of causing a halogen to act on a derivative of 1-thio-5,5-dihalo-pent-4-ene of the type $$CX_2=CH(CH_2)_3S—Y$$

in which X represents a halogen atom and Y represents hydrogen or an acyl. This latter can be a substance such as acetyl, propionyl, butyryl or the like, but acetyl is the most practical. In other words, the thio derivative which is used is a 1-thio-acyl or a 1-thiol of the aforementioned halopentene.

The reaction can be written as:

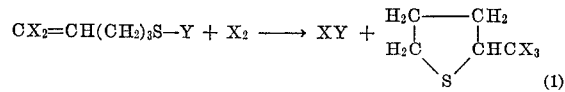

(1)

In the particular case where the halogen is Cl, XY is HCl when starting with the thiol (Y=H); it is formed by acetyl chloride when the initial material is 1-thioacetyl-5,5-dichloropent-4-ene, Y being —COCH$_3$.

This reaction according to the invention is quite unexpected: from what is known concerning the reaction of halogens with thioacetyl dihalopropenes, it was possible to expect that a trihalogenated or tetrahalogenated pentene would be obtained, and not a heterocycle. The invention is thus based on the discovery of a new fact, which does not follow a law of analogy with the lower homologues of the halopentenes.

DESCRIPTION OF THE PREFERRED EMBODIMENT

The preparation according to the invention is preferably carried out at a moderate temperature, which is generally between 0 and 50° C. Excellent results are obtained at temperatures close to ambient temperature, i.e., from 10 to 30° C. In view of the instability of the 2-trihalomethyl-1-thiolanes(1), it is advisable to work at relatively low temperatures, particularly at ambient temperature, when it is desired to produce these compounds. On the other hand, with a view to preparing the dihalomethylene-2-thiolanes, it is possible to operate in a hotter medium; in addition, in order to obtain these compounds, when starting from the former, it is desirable to raise the temperature, and this can be achieved simply by distillation of the dichlorinated derivative from the reaction medium. This process is also applicable to the preparation of homologues of the aforementioned thiolanes, particularly of those of which one or more of the H atoms in the 3, 4 and/or 5 positions are replaced by radicals such as methyl, ethyl, butyl, isobutyl, propyl, isopropyl, pentyl, hexyl, decyl, and dodecyl.

The proportion of free halogen to be employed is practically stoichiometric, a small excess of halogen being useful.

In the particular case of the chlorinated derivatives, the very rapid transformation which takes place can be represented by the following diagram:

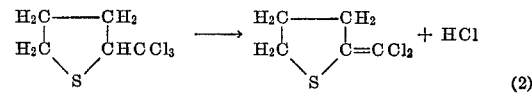

(2)

The invention is illustrated by the following nonlimiting examples.

EXAMPLE 1

With the object of preparing trichloromethyl-2-thiolane, 15 g. of chlorine, i.e., 0.422 atom, is caused to enter 42.6 g., i.e., 0.2 mol., of 1-thioacetyl-5,5-dichloro-pent-4-ene, $$CCl_2=CH(CH_2)_3S=COCH_3$$

The operation lasts 2½ hours at the normal temperature of about 20 to 23° C.

After the formed acetyl chloride has been distilled under vacuum at the same temperature the trichloromethyl-2-thiolane remains in the apparatus.

EXAMPLE 2

With the object of preparing dichloromethylene-2-thiolane, the operation is started by the preparation described in Example 1, but the temperature is raised during the distillation of the acetyl chloride, and then the dichloromethylene-2-thiolane (2) is caused to distill at about 85-90° C.; 20 g. of this compound are thus obtained, this representing a yield of 60% with respect to the thioacetyl which is used.

EXAMPLE 3

In a preparation similar to that of Example 1, 0.2 mol of 1-thiol-5,5-dichloro-pent-4-ene $$CCl_2=CH(CH_2)_3SH$$

i.e., 34.2 g. are used in place of the thioacetyl. The sequence of the operations is the same as previously. For preventing the decomposition of the trichloromethyl-2-thiolane, these operations are carried out below 20° C.

EXAMPLE 4

After commencing the preparation, as in Example 3, the acetyl chloride which has formed is eliminated by distillation between 50 and 55° C. after which the dichloromethylene-2-thiolane which has formed is distilled. The yield of this product is 60%, as in Example 2.

The dichloromethylene-2-thiolane which is obtained has a boiling point of 87° C./2 mm. Hg.

EXAMPLE 5

The tribromomethyl-2-thiolane is prepared by the working method of Example 1, by causing 34 g. of bromine to react with 60.4 g. of 1-thioacetyl-5,5-dibromo-pent-4-ene.

EXAMPLE 6

A part of the tribromomethyl-2-thiolane, obtained in Example 5, is subjected to distillation under reduced pressure at about 95° C. The distillate is dibromomethylene-2-thiolane.

The dihalomethylene-2-thiolanes can be easily transformed into corresponding sulphones by controlled oxidation. This latter can be carried out in liquid medium under the action of an oxidizing agent, such as more particularly hydrogen peroxide. The operation gives the sulphone with a good yield, when working in an aliphatic organic acid medium, for example, acetic, propionic, butyric and like acids. It leads to the dihalomethylene-2-tetramethylene-sulphones, which are new compounds as yet unknown. These new sulphones are useful as extraction solvents, particularly of aromatic hydrocarbons, tars, tall oil, fatty acids, etc.; they are used as solvents in polymerization, or even as plasticizers; they are also suitable as hydraulic fluids or textile-finishing agents. The presence of halogen in their molecule extends the range of use of these substances and permits them to be used advantageously in the cases where the sulphones which are usually employed (for example, tetramethylene sulphone "Sulfolane") and do not give entire satisfaction.

EXAMPLE 7

20 g. of dichloromethylene-2-thiolane are dissolved in 40 ml. of acetic acid; to the solution which is obtained, there are added dropwise, while stirring, 60 ml. of hydrogen peroxide at 110 volumes. The reaction medium is heated, because of the exothermal reaction which takes place:

The temperature rises spontaneously from ambient temperature up to about 80° C.

After the introduction of all of the hydrogen peroxide, the reaction mixture is left standing for 2 hours. Water is then added in order to precipitate the sulphone. After recrystallization from alcohol, the dichloromethylene-2-tetramethylene sulphone is obtained with a yield of 80%. It melts at 91° C.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the preparation of a thiolane, the nucleus carbon atom of which in the 2-position bears a dichloromethylene or trichloromethyl group, comprising reacting a halogen selected from the group consisting of chlorine and bromine with a derivative of 1-thio-5,5-dihalo-4-pentene having the structure $$X_2C=CH(CH_2)_3SY$$

where X is a halogen selected from the group consisting of chlorine and bromine and Y is selected from the group consisting of hydrogen and lower alkanoyl groups, the reaction being carried out at a temperature of 0° to 50° C. and then separating the thiolane formed from the reaction mixture obtained.

2. A process as recited in claim 1, wherein the amount of said halogen reacted is approximately 1 mole per mole of said derivative 3. A process as recited in claim 1, wherein said derivative is 1-thiol5,5-dichloro-4-pentene.

4. A process as recited in claim 1, wherein said derivative is 1-thioacetyl-5,5-dichloro-4-pentene.

5. A process as recited in claim 1, wherein the obtained reaction mixture is subjected to vacuum distillation at a temperature of 0° to 50° C. to distill off impurities and recover a residue of 2-trihalomethyl-thiolane.

6. A process as recited in claim 1, wherein the obtained reaction mixture is subjected to vacuum distillation at a temperature of 0° to 50° C. to remove impurities, and then the residue which remains is distilled at a temperature of 50° to 150° C. in vacuo, to recover a distillate of 2-dihalomethylene-thiolane.

7. A process as recited in claim 6, wherein the said halogen and the element X are both chlorine, and the distillation temperature of said residue is 70° to 100° C.

8. A 2-trichloromethyl-thiolane having the structure

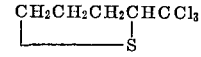

9. A 2-dichloromethylene-thiolane having the structure

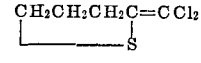

10. The derivative of 2-dichloromethylene-thiolane having the structure

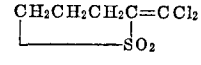

References Cited

UNITED STATES PATENTS 3,149,124  9/1964  Krespan _____ 260—332.2

OTHER REFERENCES

Petrova et al.: Chem. Abs. 52:12750e (1958).

HENRY R. JILES, Primary Examiner

C. M. SHURKO, Assistant Examiner

U.S. Cl. X.R.

26—1; 260—332.5, 412.8, 455, 609